March 24, 1931.  W. MERRILL  1,797,691
MEANS FOR CONNECTING TUBULAR ARTICLES
Filed Jan. 30, 1929
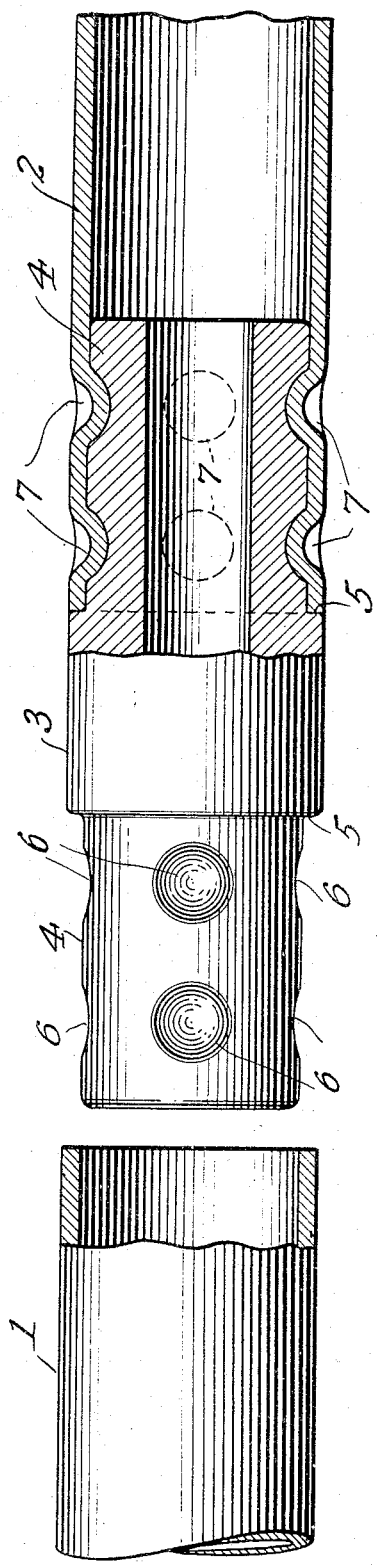
INVENTOR
WHITNEY MERRILL
BY
Sheffield & Betts
HIS ATTORNEYS Patented Mar. 24, 1931

1,797,691

UNITED STATES PATENT OFFICE

WHITNEY MERRILL, OF BROOKLYN, NEW YORK

MEANS FOR CONNECTING TUBULAR ARTICLES

Application filed January 30, 1929. Serial No. 336,285.

This invention relates in general to means for connecting tubular members to plugs or other articles adapted to have a portion thereof inserted in the tubular members and is concerned more particularly with means for connecting tubular members to coupling plugs and sockets used in connection with metallic scaffolding involving pipes or tubular members in the place of wooden cross pieces and uprights.

In connecting tubular members to various articles a portion of which may be, and preferably is, inserted into the tubular member various means such as, for example, locking pins extending through the parts, have been employed. Where the tubular members are subjected to heavy longitudinal stresses it is necessary to use pins of relatively large diameter. This necessitates the making of a large hole through the parts, thereby reducing their strength. Other tubular connecting means comprise members which project beyond the outside surface of the tubular members which is frequently objectionable in certain classes of construction, particularly in scaffolding where it may be desired to clamp various tubular members together at the places where the joints are located.

The object of the present invention, therefore, is to provide means for connecting comparatively large tubular members to articles, a portion of which is adapted to be inserted into the tubular member, in such a manner that the connection between the two pieces will be of great strength and without the necessity of supplying additional parts or having connecting means that project beyond the surface of the tubular member.

Another object of the invention is to provide connecting means of simple design which may be quickly and economically formed in the material of the parts to be connected together without weakening either and which means may be easily and conveniently applied.

A still further object is to provide connecting means of such design that the interior of the connecting member may be made hollow or with a passage therethrough if it be desired to transport fluids through the tubular members.

For a full description of the present invention reference may be had to the following description and the accompanying drawing in which Fig. 1 is a partial cross-sectional view of two tubular members illustrating a preferred form of the present invention as applied to tubular members to which a coupling plug is to be connected.

In the drawing the numerals 1 and 2 indicate two tubular members which are to be connected together through the medium of a coupling plug 3, a preferred form of which is shown in the drawing. The coupling plug 3 is preferably hollow and comprises two end portions 4 of slightly reduced diameter as shown, thus forming the shoulders 5 against which the ends of the tubular members 1 and 2 abut. The diameters of the end portions 4 of the plug are such that the plugs fit snugly into the ends of the tubular members. Each of the portions 4 is provided with a plurality of depressions 6 distributed over the surface of the plug in a convenient manner, such as illustrated in the drawing. The depressions 6 may be, and preferably are, spherical or cup-shaped in form and of a convenient diameter. After the portion 4 of the plug 3 is inserted in the end of the tubular members those portions of the tubular members adjacent the depressions 6 are forced inwardly so that the material of the tubular member is displaced into the depressions 6, as indicated at 7.

It will be appreciated that the depressions 6 may assume a variety of forms and be distributed over the surface of the portions 4 in any desired manner; thus, for example, the depressions may be made in the form of a single circular series encircling the portions 4.

It has been found that with tubular members of the comparatively large size indicated in the drawing, that is, about two inches in diameter, and having a number of depressions corresponding approximately to the number shown, great enough longitudinal forces may be exerted upon the tubular members 1 that the members will rupture before they will be pulled from the coupling plug 3.

I am aware that the bristle-holders of paint brushes and other objects have been connected to various handles or similar parts by means of metallic ferrules which have been notched, punched or depressed so that the metal of the ferrule is forced into the material of the handle, but the present invention constitutes a decided advance over such prior art since it is adapted to be used in connection with tubular members of large diameter and which are ordinarily subjected to relatively large longitudinal forces. As shown in the accompanying drawing the amount of material depressed from the tubular members into the depressions 6 is such that a great longitudinal pull would be necessary to shear off the punched portions 7 or force them out of the depressions 6 and it has been found that the metal of the tubing or pipes used may rupture before the connecting member will be separated therefrom.

In addition to providing great strength to resist longitudinal pulls on the pipe members, the fact that independent cup-shaped recesses are provided in the plug member effectively prevents any tendency of one of the members to rotate relatively to the other, and the parts are so firmly united that the pipe members themselves would become twisted before the connecting portions would be caused to rotate upon each other.

Having thus illustrated and described this specific embodiment of my invention, I do not wish to be understood as being limited to the details set forth for the construction and arrangement of parts may be altered as the occasion requires, or the apparatus otherwise modified by those skilled in the art without departing from the spirit and scope of the invention as set forth in the appended claims.

What is claimed and desired to be secured by Letters Patent is:

A metallic tubular structure comprising two tubular members of the same diameter adapted to be coupled together and a coupling plug of forged metal having a central portion of the same diameter as the tubular members and having two reduced portions of substantially the internal diameter of said tubular members, said portions having independent cup-shaped recesses or depressions therein and said tubular members having depressions corresponding to said recesses and positively engaging the latter, whereby the tubular members are coupled together to form a unit of uniform diameter.

WHITNEY MERRILL.